(No Model.) 2 Sheets—Sheet 1.
H. C. REAGAN, Jr.
AUTOMATIC RETAINING AND REINFORCING BRAKE VALVE.
No. 531,968. Patented Jan. 1, 1895.
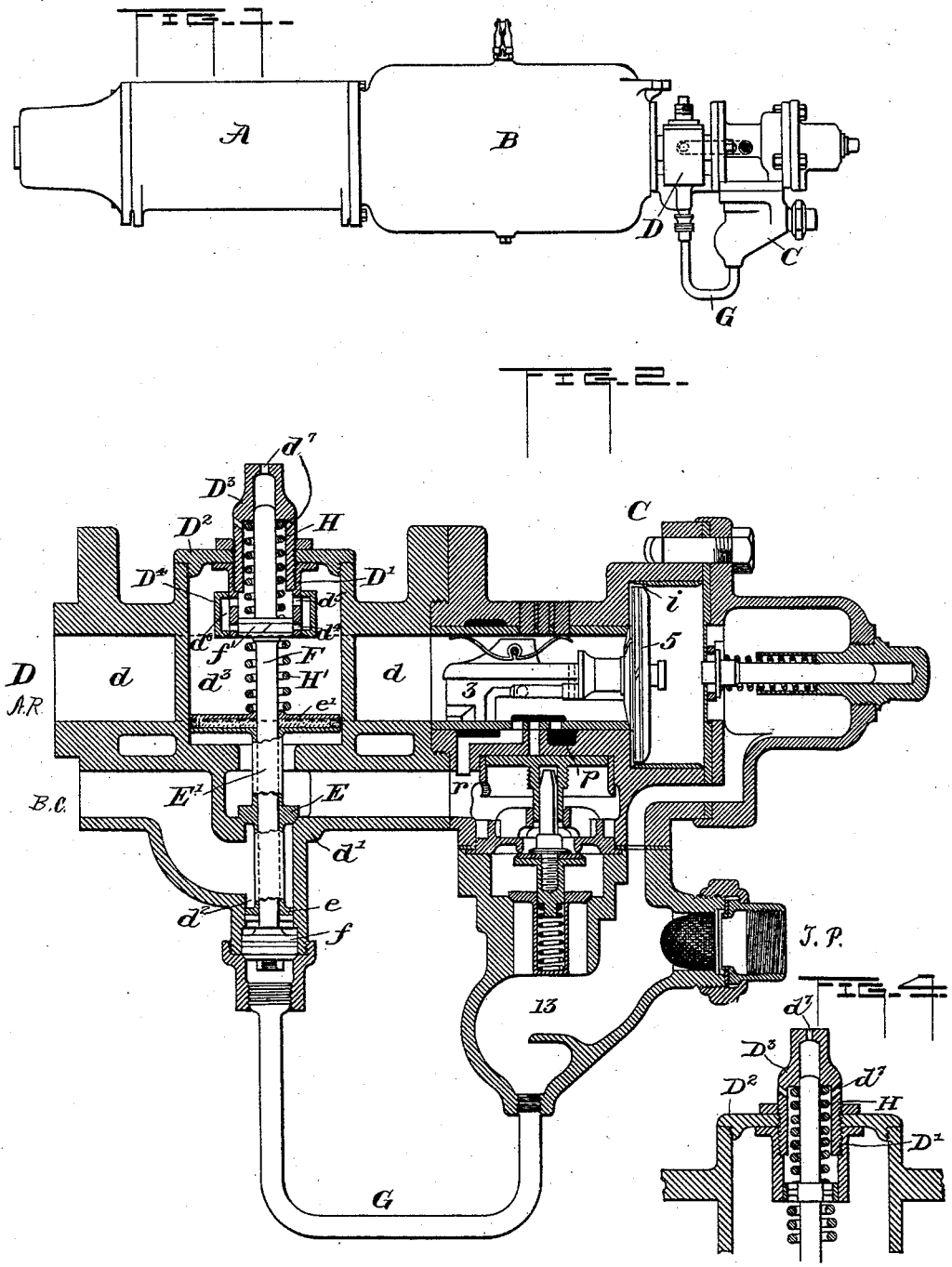
Witnesses
C. L. Sturtevant
Gales P. Moore
Inventor
Harry C. Reagan Jr.
By Geo. R. Whinery
Attorney (No Model.) 2 Sheets—Sheet 2.
H. C. REAGAN, Jr.
AUTOMATIC RETAINING AND REINFORCING BRAKE VALVE.
No. 531,968. Patented Jan. 1, 1895.
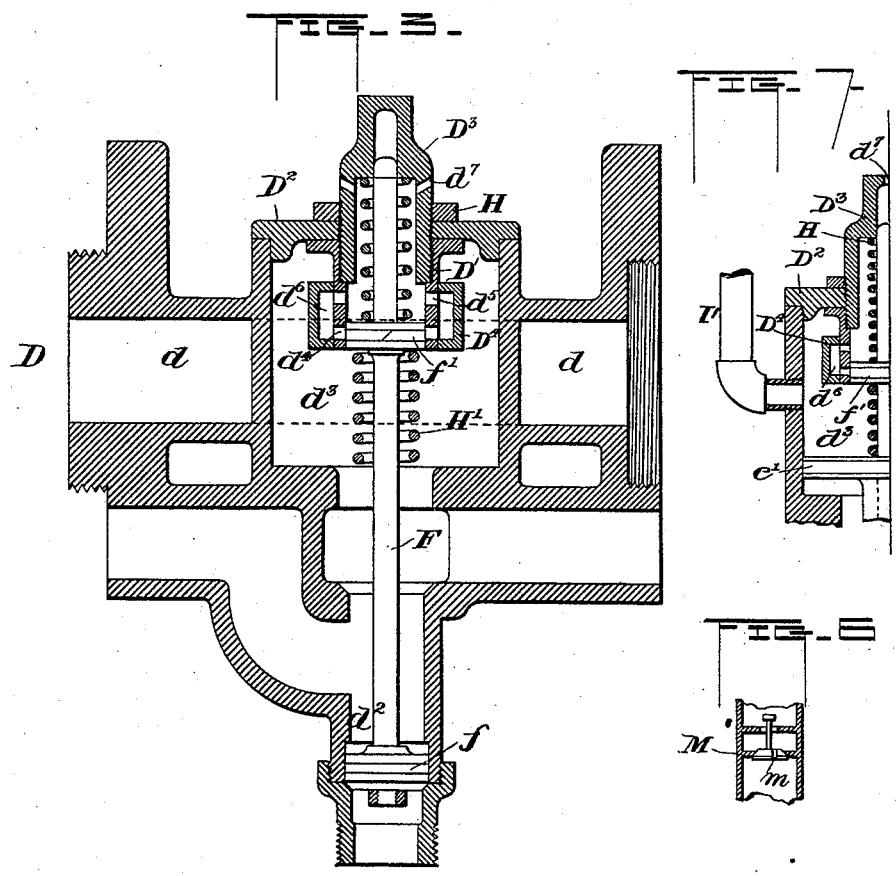
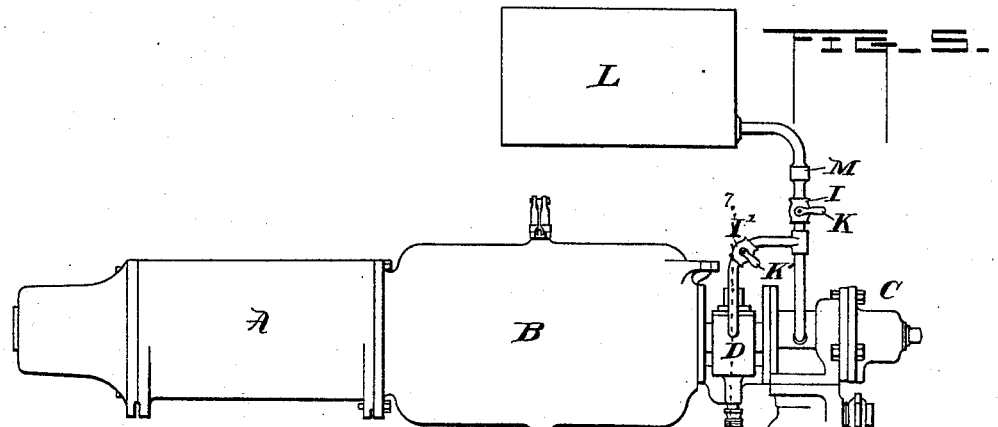

UNITED STATES PATENT OFFICE.

HARRY C. REAGAN, JR., OF PHILADELPHIA, PENNSYLVANIA.

AUTOMATIC RETAINING AND REINFORCING BRAKE-VALVE.

SPECIFICATION forming part of Letters Patent No. 531,968, dated January 1, 1895.

Application filed October 24, 1893. Serial No. 489,030. (No model.)

*To all whom it may concern:*

Be it known that I, HARRY C. REAGAN, Jr., a citizen of the United States, residing at Philadelphia, in the county of Philadelphia and State of Pennsylvania, have invented certain new and useful Improvements in Automatic Retaining and Reinforced Brake-Valves; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to fluid pressure brakes for railway trains, and it is especially adapted for use in connection with the well known Westinghouse automatic air-brake system.

In arriving at a clear understanding of my invention, a brief *résumé* of the Westinghouse system will be helpful. An air pump on the locomotive supplies compressed air at a pressure of ninety pounds to a main reservoir on the locomotive or tender, from which the air is led through a controlling valve in the cab (the engineer's valve) to a train pipe connected with auxiliary reservoirs located under the cars. A triple valve controls the flow of air from the train pipe to each auxiliary reservoir, and from the reservoir to the brake cylinder, the valve being so constructed that when the air pressure in the train pipe is at its normal, seventy pounds, the triple valve opens communication between the train pipe and the auxiliary reservoir, and closes the passage from the reservoir to the brake cylinder, the latter being opened to the atmosphere through an exhaust port in the triple valve. To apply the brakes, the engineer reduces the train pipe pressure, which causes the triple valve to cut off the reservoir from the train pipe, connect the reservoir with the brake cylinder, and close the exhaust. This operation of course draws part of the air from the auxiliary reservoir into the brake cylinder, and this loss can only be made up by a fresh supply from the main reservoir; but in order to recharge the auxiliary reservoir, the triple valve must be moved to connect said reservoir with the train pipe, and when the valve is so moved, it opens the exhaust and allows the air in the brake cylinder to escape. It is therefore impossible in the Westinghouse system as commonly constructed and used to recharge the auxiliary reservoir and yet keep the brakes set. To be able to do this is frequently very desirable, where a great many stops have to be made in quick succession, or where a long grade requires a constant application of the brakes for a considerable time, in which case the auxiliary reservoir pressure may fall so low by leakage as to be unable to hold the train.

The object of my invention is to enable the auxiliary reservoir to be recharged without releasing the brakes.

It consists of a retaining valve of peculiar construction connected with the triple valve, and, like the triple valve, automatically operated by changes in the train pipe pressure. It works in combination with the triple valve, and necessitates no change whatever in the construction of said valve. It interferes with the customary functions of the triple valve in only one respect, to wit: that of exhausting the air from the brake cylinder. This function is transferred from the triple valve, to my retaining valve, which is really an exhaust valve under the control of the engineer, and independent of the triple valve.

My invention can be applied to all existing equipments of the Westinghouse automatic brake without any alteration or disturbance in the system.

In the drawings, Figure 1 is an elevation of a brake cylinder, auxiliary reservoir, triple valve and retaining valve. Fig. 2 is a sectional elevation on a larger scale of the triple valve and retaining valve. Fig. 3 shows a modified retaining valve. Fig. 4 is a modification. Fig. 5 shows a further modification by which the pressure in the brake cylinder can be gradually reduced, and Fig. 6 is an enlarged view of the check valve. Fig. 7 is a vertical half section on line 7—7 of Fig. 5.

I have shown the invention embodied in a freight car equipment of the Westinghouse system, but it is applicable to any and all equipments of that system, or indeed of any automatic fluid pressure valve system.

The brake cylinder A, auxiliary reservoir B, and triple valve C are all of the usual construction and need not be described in detail.

My retaining valve D is shown in Fig. 1 in its preferred relative position, that is, interposed between the triple valve and the auxiliary reservoir.

In Fig. 2 the internal construction and arrangement of both valves are fully shown. The triple valve is shown in the position in which it stands when the brakes are off. The retaining valve comprises a casing in which are cored out cylinders or chambers for the pistons, valves or other equivalent abutments to work in, and also passages for the air. One of these passages $d$ connects the triple valve directly with the auxiliary reservoir. If desired this connection may be made by a pipe, or in any other suitable manner, since my retaining valve governs only the passage from the triple valve to the brake cylinder. It is preferred, however, to use the construction shown, for the sake of simplicity and compactness. In the passage between the triple valve and the brake cylinder, is a valve seat $d'$ on which fits a valve E which controls said passage. The valve is mounted on or formed integral with a sleeve $E'$ which carries at its lower end a piston $e$ sliding in a cylinder $d^2$ communicating with the passage below the valve E. The piston and the valve are of the same area, so that they are balanced with reference to any pressure below the valve. The upper end of the sleeve rises into a chamber $d^3$ of considerably larger area, in which slides a piston $e'$ fixed to the sleeve $E'$, and exposed to the air pressure in the passage above the valve E. Through the sleeve passes a rod F the lower end of which carries a piston $f$ which slides in the cylinder $d^2$ below the piston $e$. The bottom of this cylinder is open to the train pipe pressure, preferably by means of a pipe G running to the chamber 13 in the triple valve casing. The upper end of the rod carries a piston $f'$ sliding in a cylinder $D'$ depending from a cap $D^2$ screwed into the top of the large chamber $d^3$. Above the piston $f'$ is a strong helical spring H the tension of which can be adjusted by the hollow plug $D^3$ screwing into the top of the cylinder $D'$. A light spring $H'$ is interposed between the piston $f'$ and the large piston $e'$ and tends to hold the valve E to its seat. The cylinder $D'$ has ports $d^4$ near its lower end which are normally closed by the piston $f'$, as shown. Above the piston are other ports $d^5$ which communicate with the ports $d^4$ by passages $d^6$. These may be conveniently formed by an interiorly grooved ring $D^4$. The plug $D^3$ has one or more ports $d^7$ leading to the atmosphere.

The operation is as follows: The spring H is so adjusted as not to yield when the lower piston $f$ is subjected to the normal train pipe pressure of seventy pounds, but yet so as to be overcome by any considerable increase of pressure above seventy pounds The parts stand normally as shown in Fig. 2. The air from the train pipe can freely pass the piston 5 of the triple valve through the port $i$, and the auxiliary reservoir is charged. Now let the engineer move the handle of his valve to the proper position for a service stop. The piston 5 of the triple valve moves back, closing the port $i$ and shifting the slide valve 3 to connect the auxiliary reservoir with the passage $r$. The air at seventy pounds rushes into the chamber $d^3$ and lifts the large piston $e'$, unseating the valve E and allowing the air to pass into the brake cylinder. When the engineer restores the train pipe pressure, the triple valve returns again to its normal position, cutting off the brake cylinder from the auxiliary reservoir, and the spring $H'$ closes the valve E and prevents the air in the brake cylinder from escaping through the exhaust port $p$ which is now open again. The small amount of air above the valve E escapes through this port $p$ but it is so small as to be of no consequence. Since the valve E is balanced by the piston $e$ the spring $H'$ easily holds it closed, and retains the air in the brake cylinder. Meanwhile the auxiliary reservoir has been recharged, since the train pipe was put in connection with it as soon as the triple valve assumed its normal position. The problem now is, to release the brakes; since it is evident that the triple valve has been deprived of this part of its usual functions. To do this, the engineer swings his valve handle to the "position for releasing brake" which admits air to the train pipe at the full main reservoir pressure of ninety pounds. This overcomes the spring H and lifts the piston $f$ which picks up and raises the piston $e$ and sleeve $E'$ unseating the valve E and permitting the air in the brake cylinder to escape freely through the exhaust port $p$. When the piston $f'$ rises it uncovers the ports $d^4$ and permits any excess of air pressure which may have leaked into the chamber $d^3$ above the large piston $e'$ to escape through the passages $d^6$ and the ports in the hollow plug $D^3$. It is evident, however, that these ports may be dispensed with without affecting the operation of the rest, the chamber being permanently open to the atmosphere, and the piston $f'$ being replaced by any guide affording suitable seats for the springs H and $H'$, as shown in Fig. 4. By using the piston $f'$ and its co-operating ports, I am enabled, however, to utilize the air pressure to hold the valve E to its seat, either in lieu of or in addition to the spring $H'$.

Upon referring to Fig. 5 there is seen a pipe I leading from the exhaust port $p$ of the triple valve and provided with a branch $I'$, running to the chamber $d^3$ which it enters above the piston $e'$. The pipe I has a stop cock K and the branch pipe a stop cock $K'$. The mode of operation is as follows: The stop cock K is closed and the cock $K'$ opened. After the brakes have been applied and the triple valve restored to its normal position, the air above the valve E escapes through the pipe I and branch I' to the chamber $d^3$ and assists in holding down the valve E. When the brakes are released by letting the abnormal pressure into the train pipe and under the lower piston, the air escapes from the brake cylinder into the chamber $d^3$ and out through the passages and ports in the upper cylinder D' as before set forth.

In the modification shown in Fig. 3, the valve E and its sleeve E' and pistons $e\ e'$ are all dispensed with. The pistons $f\ f'$ are of the same area, so as to balance. The exhaust port $p$ in the triple valve must be plugged up. The operation is then as follows: The triple valve admits air at seventy pounds to the brake cylinder. The pistons remain at rest being balanced. The triple valve then cuts off communication with the auxiliary reservoir, which is at once recharged from the train pipe, the brakes still remaining set because the exhaust port is plugged up. To release the brakes, the main reservoir pressure of ninety pounds is admitted below the piston $f$ as in Fig. 2, which raises the piston, uncovers the ports $d^4$ and permits the air in the brake cylinder to escape through the passages $d^6$ and the ports in the hollow plug $D^3$. It is evident that this construction admits of many modifications, and that the retaining valve need not necessarily be interposed between the triple valve and the auxiliary reservoir, since it only needs to have the chamber between the pistons connected with the brake cylinder, and the cylinder below the piston connected with the train pipe. In connection with this form of retaining valve, I may use the modification shown in Fig. 5 which constitutes a reinforced brake, that is to say, a brake in which the pressure in the brake cylinder is gradually instead of suddenly reduced. The object of this is to harmonize the brake pressure with the speed of the train, so that both may be lessened simultaneously and thus may be avoided the danger of sliding the wheels when the train has slowed down to a moderate speed; since the brake pressure that can be applied without sliding the wheels is proportional to the speed.

In Fig. 5, the pipe I leading from the exhaust port of the triple valve is connected with a closed tank or receiver L whose volume bears a certain predetermined ratio to that of the brake cylinder A. In the pipe above the stop cock K is a check valve M opening away from the receiver and having in it a small leakage port $m$. To bring the receiver into play and make a reinforced brake, the cock K' on the retaining valve is closed and the cock K in the receiver pipe I is opened. The action is then as follows: The brakes having been applied and the triple valve restored to its normal position to recharge the auxiliary reservoir, the air in the brake cylinder begins to leak into the receiver through the port $m$ in the check valve M. This gradually reduces the pressure in the brake cylinder until it equalizes with that in the receiver, after which no further reduction occurs. With a receiver of the same size as the brake cylinder, as shown in Fig. 5, the pressure will fall to one half its initial figure. To release the brakes, the exhaust valve is operated as set forth in the description of Fig. 3, which allows the air in the brake cylinder and the receiver to escape quickly, the outwardly opening check valve allowing free exit from the tank.

It will be seen that in all these modifications, the action is dependent upon my controllable exhaust valve, and since the construction of this valve may be considerably modified without departing from the spirit of my invention, I do not limit myself to the specific form or forms which I have mentioned above; but Having described my invention, what I claim is—

1. In an automatic fluid pressure brake system having a single train pipe, a supplementary retaining valve comprising two balanced abutments constantly exposed to the pressure in the brake cylinder, one of said abutments being adapted to be moved by an abnormal pressure in the train pipe, substantially as described.

2. In an automatic fluid pressure brake system having a single train pipe, a supplementary valve comprising two balanced abutments, one of which controls the exhaust from the brake cylinder, while the other is adapted to be moved by an abnormal train pipe pressure, substantially as described.

3. In an automatic fluid pressure brake system having a single train pipe, the combination with the triple valve, of an independent valve mechanism controlling the exhaust from the brake cylinder, said valve mechanism comprising two balanced abutments exposed to the pressure in the brake cylinder, one of said abutments moving in a chamber communicating directly with the train pipe, substantially as described.

4. In an automatic fluid pressure brake system, the combination with the triple valve, of a retaining valve comprising a chamber, two balanced abutments exposed on one side to the pressure in the chamber, means for conveying the train pipe pressure to the other side of one of said abutments, and a spring set to over-balance the normal train pipe pressure on said abutment, substantially as described.

5. In an automatic fluid pressure brake system, the combination with the triple valve, of a retaining valve comprising the abutments $f, f'$ of the same area and connected by the rod F, the lower abutment working in the cylinder $d^2$ open to the brake cylinder on top and to the train pipe below, and the upper abutment working in the cylinder D and controlling exhaust ports from the chamber $d^3$, substantially as described.

6. In an automatic fluid pressure brake system, the combination with the triple valve, of a closed receiver connected with its exhaust port, and means for retarding the escape of air from the brake cylinder into the receiver, substantially as described.

7. In an automatic fluid pressure brake system, the combination with the triple valve, of a closed receiver connected with its exhaust port, and an independent valve D controlling the escape of air from the receiver, substantially as described.

8. In an automatic fluid pressure brake system, the combination with the triple valve, of a closed receiver connected with its exhaust port, a check valve retarding the entrance of air into the receiver, but permitting it to escape freely therefrom, and an independent valve, responsive to abnormal pressure in the train pipe and controlling the exhaust from said receiver, substantially as described.

9. In an automatic fluid pressure brake system, the combination with the triple valve, of a closed receiver connected with its exhaust port, a check valve retarding the entrance of air into the receiver, but permitting it to escape freely therefrom, and an independent valve, responsive to abnormal pressure in the train pipe and controlling the exhaust from said receiver and from the brake cylinder simultaneously, substantially as described.

10. The combination with the brake cylinder, auxiliary reservoir and triple valve, of the receiver, the pipe connecting said receiver with the exhaust port of the triple valve, the check valve and the stop cock in said pipe, and the retaining valve connected with the pipe by the branch pipe, containing the stop cock, substantially as described.

In testimony whereof I affix my signature in presence of two witnesses.

HARRY C. REAGAN, Jr.

Witnesses:
HARRY FROST,
HARRY O. BENDER.